Nov. 28, 1950 W. G. H. FINCH 2,532,271

COMPACT FACSIMILE RECORDER AND SYNCHRONIZER

Filed Feb. 5, 1947 3 Sheets-Sheet 1

INVENTOR.
WILLIAM G. H. FINCH
BY Ostrolenk & Faber
ATTORNEYS

Nov. 28, 1950 W. G. H. FINCH 2,532,271

COMPACT FACSIMILE RECORDER AND SYNCHRONIZER

Filed Feb. 5, 1947 3 Sheets-Sheet 2

INVENTOR.

WILLIAM G. H. FINCH

BY Ostrolenk & Faber

ATTORNEYS

COMPACT FACSIMILE RECORDER AND SYNCHRONIZER

Filed Feb. 5, 1947 3 Sheets-Sheet 3

INVENTOR.
WILLIAM G. H. FINCH
BY Ostrolenk + Faber
ATTORNEYS

Patented Nov. 28, 1950 2,532,271

UNITED STATES PATENT OFFICE 2,532,271

COMPACT FACSIMILE RECORDER AND SYNCHRONIZER

William G. H. Finch, Newtown, Conn., assignor, by mesne assignments, to Pierce Company, Providence, R. I.

Application February 5, 1947, Serial No. 726,473

2 Claims. (Cl. 178—69.5)

My present invention relates to facsimile systems and more particularly to a facsimile recorder which is simple and inexpensive in construction and automatic in operation. Essentially my invention relates to the so-called "lawn-mower" type of scanning system wherein the receiving drum is provided with a helical raised bead to act as a recording stylus, the said raised bead working against a knife bar with the recording paper being drawn between the drum and the knife bar.

Heretofore in facsimile recorders, the usual construction involved the principal driving motor which in turn was connected to the other operating means which included the receiving drum and the recording element such as a stylus or helical bead. Such devices were expensive in construction and difficult in maintenance and also required a substantially large case for housing the same.

The specific object of my invention is the provision of novel means whereby the driving motor for the facsimile recorder is mounted within the receiving drum itself.

Another object of my invention is the application of novel and simplified automatic synchronizing means in connection with a facsimile recorder.

It will also be obvious that the drive means hereinafter described for a facsimile recorder may be used in a facsimile transmitter.

The foregoing and many other objects of my invention will become apparent in the following description and drawings in which.

Figures 4, 5, 6:
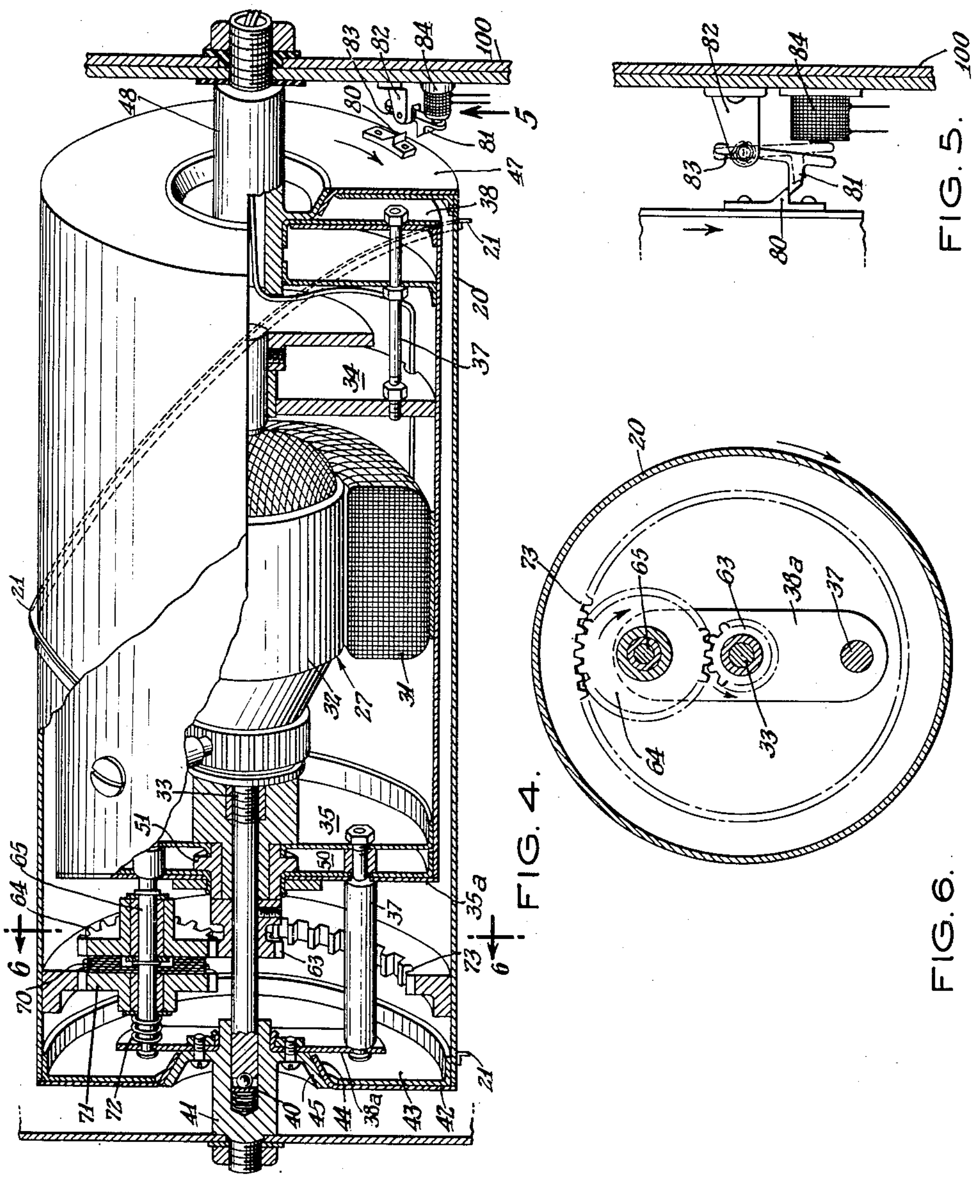
Figure 4 is a view in perspective partly broken away of my novel recorder drive.
Figure 5 is an enlarged detail of a portion of the synchronizing mechanism of Figure 4.
Figure 6 is a cross-sectional view taken on line 6—6 of Figure 4.

Referring first to Figure 4, I have here shown my novel recording drum 20 with the raised bead 21. The raised bead 21 as shown extends over almost 360° of the drum.

As an essential and primary part of my invention, the electrical motor 27 for the entire device is housed completely inside of the recording drum 20 thus decreasing the over-all size of the entire machine.

The motor 27 is a .175 horsepower motor and I have found that it does not generate any heat sufficient to harm or mar the recording.

The recording unit is provided with an inner stationary casing 30 at which is secured the stator 31 of the motor. The armature 32 of the motor is mounted on the shaft 33. The internal casing 30 is provided with end walls 34 and 35 to which are secured by appropriate bolts 37—37 the bearings 38—38 for the various rotating parts. The shaft 33 passes through the auxiliary casing wall 35*a* and terminates in the thrust bearing 40 mounted in the stub shaft 41 carried by stationary end plate 42. Plate 38, stub 41 and plate 42 are stationary. The end 43 of drum 20 is a tight sliding fit against plate 42 and the disked portion 44 of end 43 of drum matches disked portion 45 of end plate 42.

The upper end of the drum 20 (with respect to Figure 4) is closed by plate 47 which rotates with drum 20 around stationary hollow mounting shaft 48 connected to plate 38.

With the element in the position shown in Figure 4, the shaft 33 which passes through the stationary plates 35 and 50 and an appropriate bearing 51 carried thereby carries the spur gear 63 which drives the gear 64 rotatably mounted on the stationary shaft 65 carried between the stationary plate 50 and the stationary plate 38. The gear 64 is connected by the friction clutch 70 to the gear 71 which also is rotatably mounted on the shaft 65.

The gear 71 is spring biased against the clutch 70 by the compression spring 72 carried between the end of the gear 71 and plate 38. Gear 71 drives the internal gear 73 which is secured to the drum 21.

The motor 27 within the drum 21 thus drives the drum 21 through gears 63, 64—71 and the internal gear 73. The clutch 70 in one preferred form may be a friction disk between the faces of gears 64 and 71, the two gears 64 and 71 being interconnected to operate as one by reason of the fact that spring 72 presses the two gear faces together.

The clutch connection 70 between the gears 64 and 71 thus permits the drum 21 to be halted at the end of each cycle to await the receipt of the synchronizing signal to start the drum once more.

This type of start-stop synchronizing has generally been described in connection with some of my prior patents including Patent No. 2,108,983. That is, in ordinary start-stop synchronizing, the receiving drum is brought to a stop at the end of each cycle at the so-called over-lap period and on receipt of the synchronizing signal, the drum is permitted to move once more. In order to accomplish this result in the present construction, the plate 47 which rotates with the drum 20 carries the latched detent 80 which cooperates with the latch 81 pivotally mounted on the bracket 82 carried by the frame of the machine.

Latch 81 is biased toward latching engagement with the latch detent 80 by a coil spring 83. The synchronizing magnet 84 is mounted above the latch and when energized lifts the latch 81 out of latching engagement with the detent 80. When the drum 20 rotates to a position where the latching detent 80 is stopped by the latch 81, the drum is brought to a stop; this stop is permitted by reason of the friction drive clutch 70.

Figure 3:
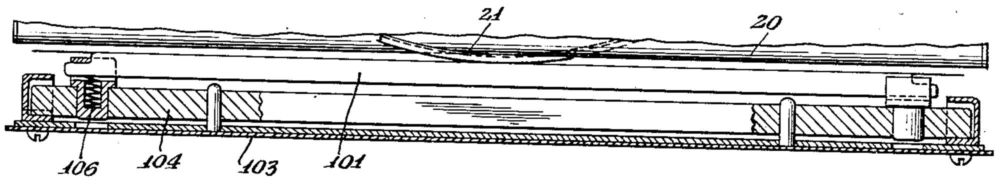
Figure 3 is a cross-sectional view of the recorder bar taken on line 3—3 of Figure 2.

On receipt of a synchronizing signal, the magnet 84 is energized to raise the latch 81 and permit the drum to rotate once more. By this means, therefore, a drum 20 which is driven by an internally mounted motor may be readily synchronized by signals from a remote transmitter. The drum 20 may be vertically mounted as shown in prior application Serial No. 689,643 or it may be horizontally mounted as here shown in a cabinet 100 so that the helical bead 21 cooperates with the knife blade 101 mounted in the front cover 103 of the cabinet 100. The knife blade here shown has the general construction and operation described in connection with my prior Patent No. 2,413,962 and is shown generally in Figure 3 where the blade 101 is mounted in a support 104 secured to the front cover 103, the blade 101 being spring biased towards engagement with the helical bead 21 on the drum 20 by springs 106.

The paper on which a record is to be made is drawn from a supply roll 110 mounted on rotatable shaft 111 and is then pulled beneath the guide roller 112 up between the blade 101 and the bead 21 and up between the pressure roller 115 mounted on the front cover 103 and the draw roll 116 and then out through slot 117 in the top of the cabinet.

The front cover 103 may be provided with the window 120 through which the received record may be read even before it is drawn out through the slot 117. An appropriate door lock 122 operated by handle 123 may be used to hold the front cover 103 in place.

The front cover 103 is hinged at the bottom 130 so that when it is opened, the knife blade 101 and pressure roll 115 are pulled away from the members with which they cooperate and the supply roll 110, the drum 20 and draw roll 116 are available for replacement, inspection and repair.

A gear 140 connected to the rotatable drum 20 drives the gear 142 on shaft 143 mounted in bearings 144 on the side of housing 100. The opposite end of shaft 143 carries gear 150 which drives gear 151 on the draw roll 116.

Figure 1:
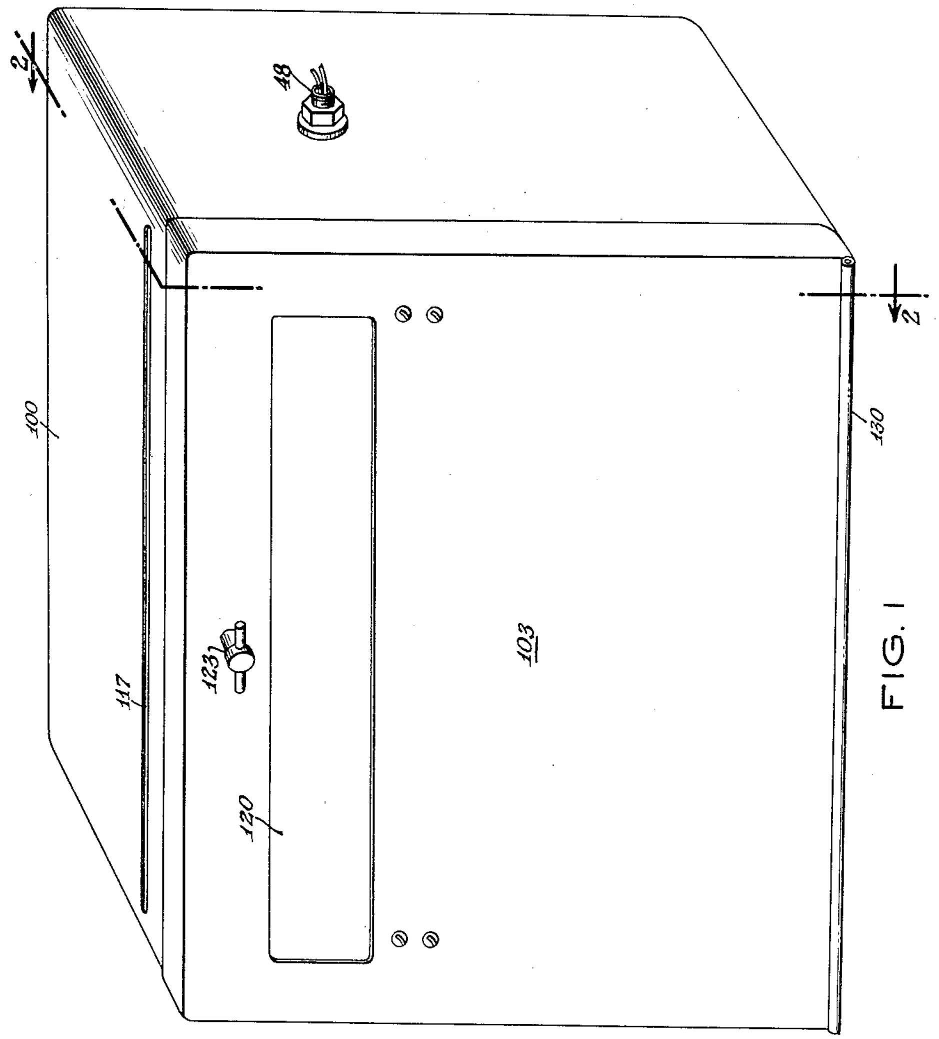
Figure 1 is a view in perspective of our novel recorder.
Figure 2:
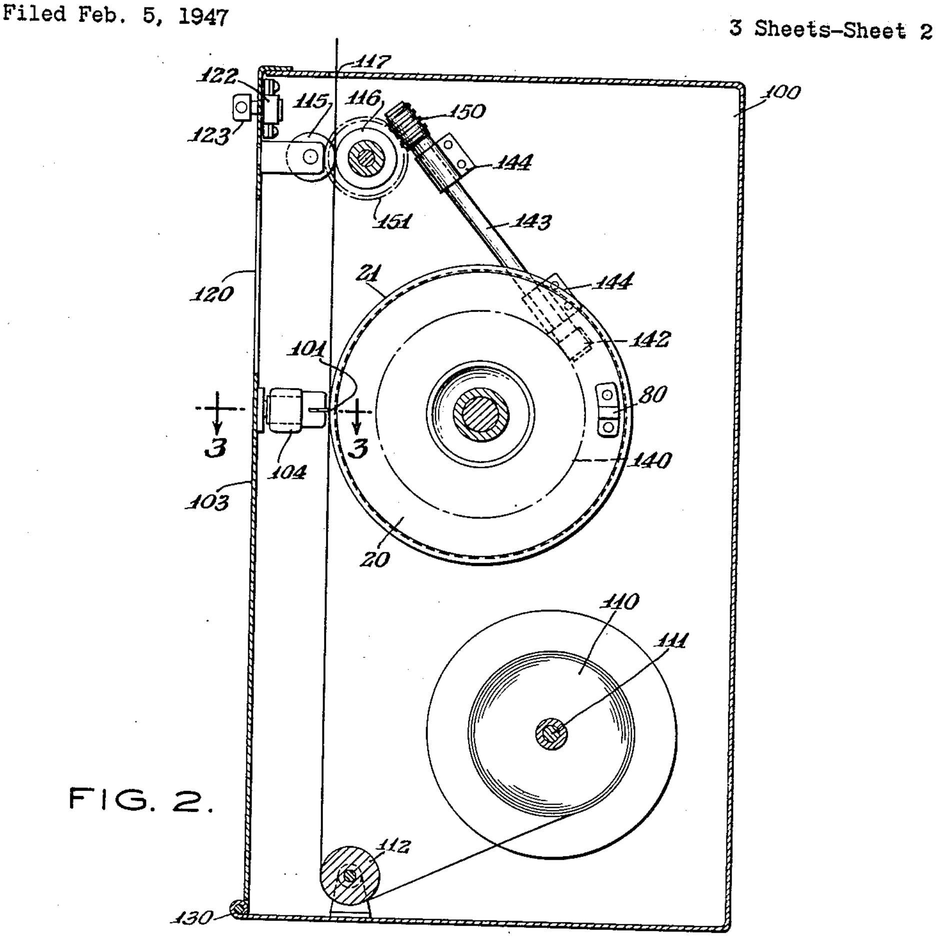
Figure 2 is a cross-sectional side view taken on line 2—2 of Figure 1.

By the means herein shown, I have disclosed a simplified drive mechanism which may be housed entirely within the interior of a recording drum (as well as a transmitting drum) in order to reduce the space requirements and make the unit extremely compact as shown in Figures 1 and 2. In addition, the arrangement of the internal drum drive is completely consistent with and makes feasible the utilization of simplified synchronizing apparatus.

While I have described my invention in connection with the utilization of a recording blade cooperating with a helical bead, it will be obvious that the drum 20 may cooperate with an ordinary recording stylus of the general type shown in my Patent No. 2,032,558.

In the foregoing, I have described my invention solely in connection with preferred illustrative embodiments thereof. Since many variations and modifications of my invention will now be obvious to those skilled in the art, I prefer to be bound not by the specific disclosures herein contained, but only by the appended claims.

I claim:

1. In facsimile apparatus, facsimile scanning means including a drum; an electric motor for operating said drum; said motor having a stator and a rotor; said stator and rotor being mounted inside said drum; connecting members between said rotor and said drum; said connecting members being also mounted inside said drum; said connecting elements including a clutch member whereby said drum may be halted while said motor and connecting members continue to operate; means for halting said drum at a predetermined phase position thereof and means responsive to a synchronizing signal for permitting said drum to begin to rotate once more.

2. In facsimile apparatus, facsimile scanning means including a drum; an electric motor for operating said drum; said motor having a stator and a rotor. said stator and rotor being mounted inside said drum; connecting members between said rotor and said drum; said connecting members being also mounted inside said drum; said connecting elements including a clutch member whereby said drum may be halted while said motor and connecting members continue to operate; a latch member for halting said drum at a predetermined phase position thereof and a magnet responsive to a received synchronizing signal for releasing said latch member to permit said drum to rotate once more.

WILLIAM G. H. FINCH.

REFERENCES CITED

The following references are of record in the file of this patent:

UNITED STATES PATENTS

| Number | Name | Date |
|---|---|---|
| 1,850,629 | Karolus | Mar. 22, 1932 |
| 1,966,617 | Dillenback | July 17, 1934 |
| 2,006,796 | Dillenback | July 2, 1935 |
| 2,421,438 | Shonnard | June 3, 1947 |